Waterman & Russell,
Tackle Block.
No. 469. Reissued June 9, 1857.
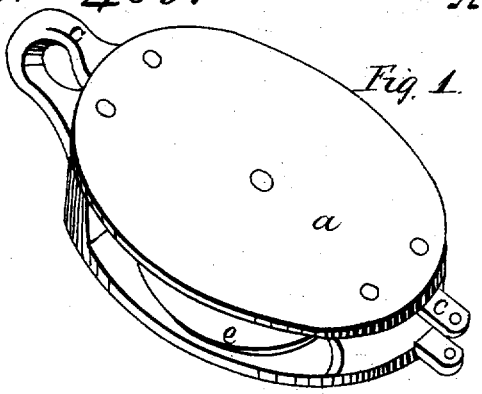
Fig. 1.
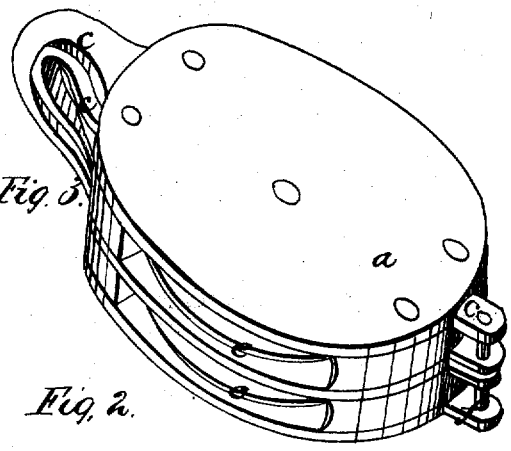
Fig. 3.
Fig. 2.
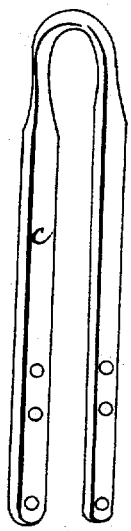
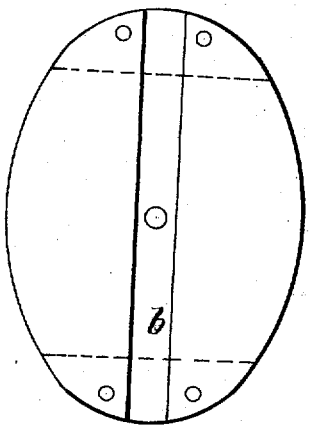
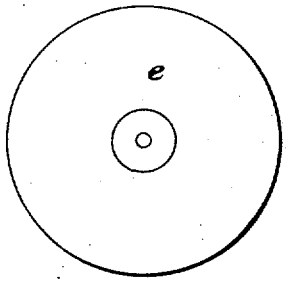
AM. PHOTO-LITHO. CO. N.Y. (OSBORNE'S PROCESS.)

UNITED STATES PATENT OFFICE.

CORNELIA WATERMAN (ADMINISTRATRIX OF THE LATE STEPHEN WATERMAN) AND ISAAC D. RUSSELL, OF NEW YORK, N. Y.

IMPROVEMENT IN SHIPS' BLOCKS.

Specification forming part of Letters Patent No. 3,421, dated January 31, 1844; Reissue No. 469, dated June 9, 1857.

*To all whom it may concern:*

Be it known that we, STEPHEN WATERMAN, of ——— countyof ———, and State of Connecticut, and ISAAC D. RUSSELL, of the city, county, and State of New York, have invented new and useful Improvements in Ships' Blocks; and we do hereby declare the following to be a full, clear, and exact description thereof, reference being had to the annexed drawings, making part of this specification.

Figure 1 represents a view in perspective of a block complete. Fig. 2 are parts of a block detached. Fig. 3 is a perspective view of a double block, showing the arrangement of its straps.

The same letters indicate the same parts in all the figures.

Our invention consists in passing the straps through grooves on the inside of each cheek of the block, the bearings of the sheave being in the strap only, by which means a shorter pin may be used.

To enable others skilled in the art to make and use our improved ship-block, we will proceed to describe the same in detail.

The shells *a* of the block are of any suitable form now in comm on use. The inner faces of them are grooved sufficiently deep, and running their whole length through the center, to receive the straps their whole thickness. The strap *c* is formed of flat bar-iron, bent into a loop at the center, resembling the form of a letter U, the two ends running straight and parallel. The curved part is rounded in its cross-section to serve as a loop to the block. Through the center of each of the straight sides of this strap a hole is formed, and when the shells are placed together and bolted at each end a sufficient distance apart to admit the sheave the strap is passed down the grooves *b*, above described. A hole is made through the center corresponding with those through the strap. The sheave *e*, made in the most approved manner, is then inserted and a pin placed in and secured, upon which said sheave revolves. The pin, having its bearing in the strap only, and close to the sheave, is much smaller than in other blocks, and which bears perfectly straight upon the strap independent of the block or shell. The ends of the strap may project through the lower side of the block, opposite the loop end, and a pin, *f*, passed through them for a becket; but in small blocks this is not usually done, in which case the strap extends a sufficient distance below the center to admit the pin *f* to pass through. In double blocks two sets of straps are employed, one placed within the other, the loop of the inner strap bearing against the lower side of the outer strap, as shown in Fig. 3. In treble or quadruple blocks three or four straps are combined in a similar manner. Blocks constructed in this manner are stronger and produce less friction, because of the small journal used, than any other now in use, and by presenting a smooth shell outside prevents the usual chafing of the rigging by straps or ropes projecting from their exterior. This block is free from all liability to split, as the pin forming the journal of the sheave rests in the strap only, relieving entirely all strain upon the shell and sheave. By placing the straps on the inner sides of the shell the bearings of the sheave are brought as close to these straps as possible, relieving the shell from all strain by having said bearings in the straps only, and the whole weight raised by the block is drawn in a direct line with the strap.

What we claim as our invention, and desire to secure by Letters Patent, is—

Passing the straps through grooves in the inner faces of the cheeks of the blocks, as herein described.

ISAAC D. RUSSELL.
CORNELIA WATERMAN,
For STEPHEN WATERMAN.

Witnesses:
S. W. WOOD,
J. Q. ADAMS.